No. 799,213. PATENTED SEPT. 12, 1905.
C. F. WILSON.
TROLLEY CATCHER AND RETRIEVER.
APPLICATION FILED JAN. 24, 1905.
2 SHEETS—SHEET 1.
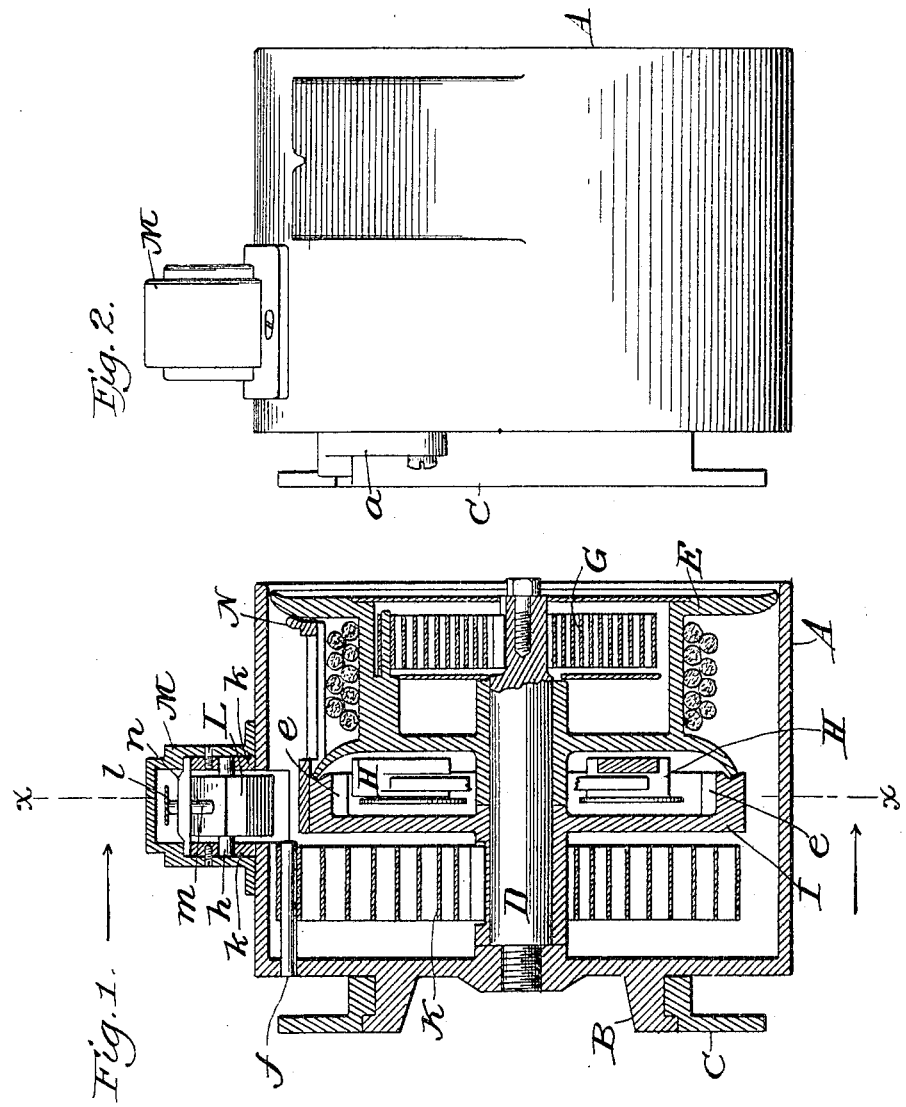

No. 799,213. PATENTED SEPT. 12, 1905.
C. F. WILSON.
TROLLEY CATCHER AND RETRIEVER.
APPLICATION FILED JAN. 24, 1905.
2 SHEETS—SHEET 2.
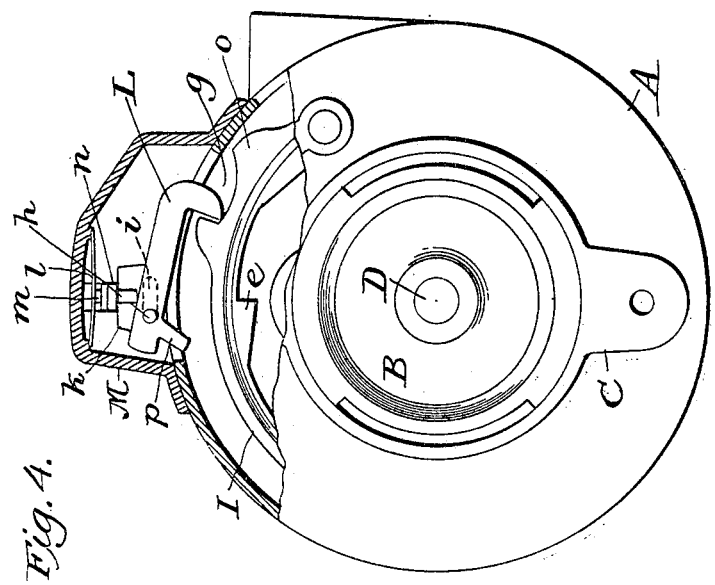
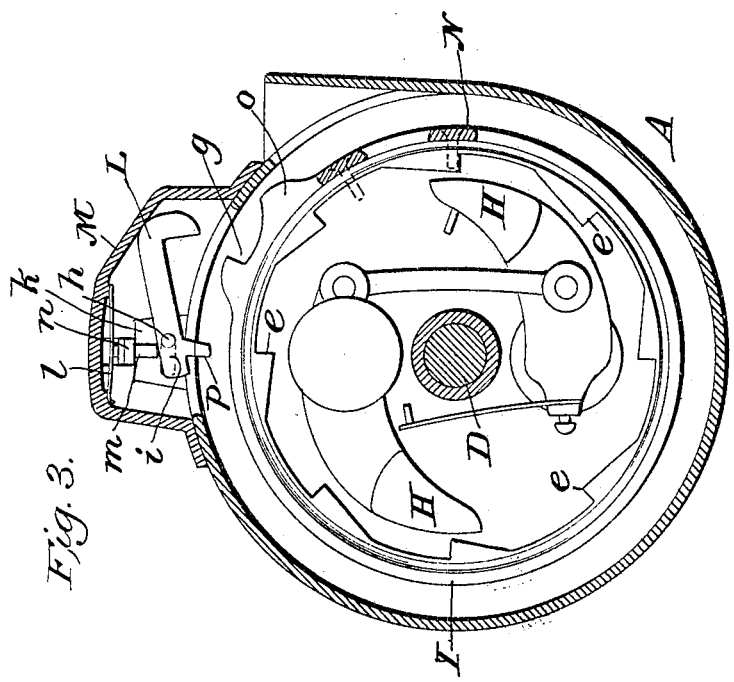
Witnesses
James F. Duhamel
L. H. Grote
Inventor
Charles F. Wilson
By his Attorney Worth Osgood

UNITED STATES PATENT OFFICE.

CHARLES F. WILSON, OF NEW YORK, N. Y.

TROLLEY CATCHER AND RETRIEVER.

No. 799,213. Specification of Letters Patent. Patented Sept. 12, 1905.

Application filed January 24, 1905. Serial No. 242,469.

*To all whom it may concern:*

Be it known that I, CHARLES F. WILSON, a citizen of the United States, residing in the borough of Brooklyn, city of New York, in the county of Kings and State of New York, have invented certain new and useful Improvements in Trolley Catchers and Retrievers, of which the following, taken in connection with the accompanying drawings and the letters of reference marked thereon, is a full, clear, and exact specification.

My present invention has relation to that class of devices intended for operation upon trolley-cars and in connection with a trolley-rope for the purpose of automatically checking or winding the said rope under certain conditions. Of these devices those which merely check the rope when the trolley leaves the line-wire are ordinarily known as "trolley-catchers" and those which afterward draw the trolley down are commonly called "trolley-retrievers."

Heretofore a combined trolley catcher and retriever has been constructed, and such a device is shown in the patent granted to me January 3, 1905, No. 778,933.

My present invention relates more particularly to the construction and operation of the locking or setting latch or dog and means whereby the same is automatically adjusted to a position to engage or hold the revolving piece or part and to release the same, the principal object of my said invention being to obviate the necessity of specially adjusting the locking latch or dog by hand.

A further object is to provide or produce a simple and convenient appliance or attachment whereby, in connection with other working parts, the setting of the locking dog or latch will be automatically accomplished according to the position of the spool or drum on which the trolley-rope is wound or, in other words, according to the position of the trolley with reference to the trolley catcher and retriever.

To accomplish the above-named objects and to secure other and further advantages in the matters of construction, operation, and use, my improvements involve certain new and useful arrangements or combinations of parts, principles of operation, and details of construction, as will be herein first fully described and then pointed out in the claims.

In the accompanying drawings, which form part of this specification, Figure 1 is an axial section and elevation of a trolley catcher and retriever having my improvements applied in connection therewith, the same being shown as when in operative position and secured upon a car or other vehicle. Fig. 2 is a side elevation or exterior view showing the outer shell with the housing for the automatically-operating locking-latch in place thereon. Fig. 3 is a cross-section and elevation on a plane through the line *x x* of Fig. 1 and looking in the direction of the arrows, the locking-latch being shown as held by its spring in elevated position or out of engagement. Fig. 4 is an end elevation looking from the rear of the device, the upper portion being broken out or away and showing the locking-latch with its housing in section, the latch being forced down by its operating-spring in position ready to engage with a revolving piece or part within the casing.

In all the figures like letters of reference wherever they occur indicate corresponding parts.

In principle of operation as well as in the general construction and arrangement the interior spool, the spool-operating springs, and the centrifugally-acting dogs are substantially the same as in my before-mentioned previous patent; but it should be understood that my present improvements are likewise applicable in connection with other means for catching and retrieving the trolley, the special means here shown being selected for convenience of illustration.

A is the outer shell or casing of the device, the same being intended to remain stationary upon the car when in place for use thereon.

B is a hub at the back of the casing, by or through which attachment may be made to the dashboard or other convenient part of the car, C being a collar for convenient application to the car and suitably fashioned to receive the hub, the hub and collar being locked together by any convenient means, as by a latch, (represented at *a*.) This plan of attaching the device upon the car may be varied as may be desired.

In the particular form shown, D is a central stud which operates as an axle for the rope-spool and also for the flanged disk operating in connection with said spool, the stud being fixed with respect to the back plate of the shell in any substantial manner.

E is the spool on which the trolley-rope is wound. This spool turns easily on the stud and is automatically controlled by a spring G, calculated to turn the spool E, so as to keep the trolley-rope taut, but not with sufficient power to draw the trolley down or off the line-wire. Connected with this spool and so as to revolve therewith around the central stud are centrifugally-acting dogs, as H H, the same being pivoted and suitably connected, their outer ends being slightly weighted, if necessary, and the arrangement being such that when the spool is turned rapidly enough the outer ends of the dogs will by centrifugal force be thrown farther from the center and will swing out to their locking or engaging points. If the trolley rises slowly, the trolley-rope turns the spool slowly and winds the spool-spring, and as the trolley is gradually lowered, as by reason of the position of the line-wire, the spring slowly turns the spool and winds up the trolley-rope, thus always keeping a light strain on the rope, or enough to keep it taut. When the trolley leaves or jumps the line-wire, a sudden turn is given the spool through the trolley-rope, and this causes the dogs to swing out and to engage with the nearest abutments or ledges on the flanged disk, thus starting the latter ahead and either bringing the retrieving-spring into action or catching and holding the trolley. Before the machine is applied for use enough of the trolley-rope to insure the proper elevation of the trolley is wound upon the spool.

Within the casing is a disk I, which, like the spool, is mounted so as to turn easily upon the central stud, and this disk carries a number of projections or ledges, as $e$ $e$, &c., arranged to be engaged by the dogs H whenever the latter are thrown outwardly far enough from the center. As soon as this engagement takes place the disk I must revolve (or tend to revolve) with the spool E.

K is a strong spring called the "retrieving-spring," connected at one end with the stationary casing, as by a pin $f$, and at the other end in any suitable way with the disk I, preferably with the hub of the latter. The purpose of this spring is, when it is free to act, to turn the disk, and through it (and through the dogs which connect the disk and spool) to turn the spool, whereby the rope on the spool will be wound up and the trolley thereby drawn down and away from the line-wire, or "retrieved," as it is said. The purpose of this movement, as is well understood, is to prevent damage to the overhanging wires and appliances and to hold the trolley ready for replacement in working position. The disk I in addition to the ledges $e$ $e$, which are shown as within its outer margin, is supplied with outer projections between which is a notch, as $g$, against one face of which the locking latch or dog engages, by which the said disk and the retrieving-spring are held fast or afterward released, according to circumstances.

L is the latch or dog for disk I, the same being mounted in a suitable housing, as M. The latch L is supplied with a hinge pin or axis $h$, located a little distance from the nearest extremity of the latch, and on this hinge-pin the latch turns within proper limits. The hinge-pin is mounted in slots $i$, located in suitable blocks $k$, secured in the sides of the housing, the arrangement being such that the latch L may be moved back and forth as well as around the axis, the axis traveling back and forth with the latch. When the hooked end of the latch L is engaged with the disk, the disk and the retrieving-spring are held in readiness to be brought into operation. The retrieving-spring is wound up by the simple expedient of first pulling the trolley-rope rapidly, so that the centrifugal dogs will engage the disk, and then further pulling the rope until this spring is wound to the desired tension, when the latch L engages the disk and holds it against the tension of the retrieving-spring. When the trolley jumps the line-wire or otherwise suddenly rises, the centrifugal dogs fly out and engage the disk, causing the latter to turn slightly in the same direction as the spool, and this movement is enough to allow the latch to be freed and raised by means of the spring provided for the purpose. Then the retrieving-spring is free to act, and it turns the disk and the spool in the direction necessary to wind the trolley-rope, and thus draws down the trolley or retrieves the same.

The mechanism for controlling the movements of the dog or latch L is of peculiar construction and operation in order that the latch may at times be held so that its tendency is to rise out of engaging position and at other times so that its tendency is to fall for engagement and always under spring-pressure. Within the housing is a spring $l$ of any suitable form, preferably a flat spring, as indicated, and this spring acts upon a pin $m$, passing through a block $n$ and bearing on the latch L. The block $n$ is held in place by the side blocks $k$ or by other suitable means, as may be desired. When the spring-actuated pin $m$ bears on the latch L between the hinge-pin $h$ and the extremity opposite the hooked end, as shown in Fig. 3, the latch will be forced up or out of engagement with the disk, and when the pin $m$ bears on the other side of the hinge-pin $h$ then the latch will be forced down into position for engagement with the disk, as indicated in Fig. 4. The shifting of the latch, it is apparent, will carry the hinged pin $h$ from one side to the other of the spring-pin $m$. According to my present invention the shifting of the latch is to be automatically accomplished through the medium of the trolley-rope—that is, the adjustment of the rope is to effect the proper adjustment of the latch without further attention from the operator.

In connection with the disk I, I secure a projecting plate N, which reaches over the spool E and is provided with a slot through which the trolley-rope passes. When the trolley-rope moves easily through the slot in the plate N, it is taken care of or kept taut by the spool-spring. When the dogs fly out and cause the retriever-spring to act, as above explained, then the trolley-rope is wound up, the spool, the disk, and the plate N turning together, the rope winding over the plate N, sufficient room for this purpose being provided within the casing and outside the circle traversed by the plate N. Then when the rope is pulled out by hand in order to readjust the trolley the engagement of this rope with the disk I through the medium of the plate N, on which the rope is wound, causes the disk to be turned in the opposite direction. The backward turning of the disk by this means causes a projection $o$ on the disk in advance of the notch $q$ to strike against a projection $p$ on the locking-latch, and thereby carries or shifts the latch so that its hinge-pin will pass to the other side of the spring-pin $m$, and then the spring-pin bears the hooked end of the latch down ready for engagement with the disk. When the rope is unwound from the plate N, so that it passes freely through the slot in that plate, of course it will not further turn the disk, and then when released the disk will be engaged by the spring-depressed locking-latch.

From the foregoing it will be understood that the adjusting of the trolley by the unwinding of the trolley-rope is all that is necessary to accomplish the setting of the retriever-spring and after the device is thus set it will automatically retrieve the trolley as soon as the latter leaves the line-wire.

Having now fully described my invention, what I claim as new herein, and desire to secure by Letters Patent, is—

1. In a device for winding a trolley-rope, the combination of a spring-actuated spool, a retriever-spring, a disk connected with said retriever-spring and means for connecting said spool and disk, and a slotted plate applied on the disk to receive the trolley-rope and cause the disk to revolve as said rope is unwound, substantially as set forth.

2. In a device for winding a trolley-rope, the combination with a disk connected with a retriever-spring, of a locking-latch for engagement with said disk, and a spring-actuated pin bearing on the latch, said latch being arranged to be moved by the disk to automatically carry its hinge-pin to one side or the other of the spring-actuated pin, substantially as and for the purposes set forth.

3. In a device for winding a trolley-rope, the locking-latch having a hinge-pin, slotted plates for sustaining said hinge-pin, and a spring-actuated pin bearing on the latch, the parts being arranged and combined substantially as set forth.

4. The combination with the hinged latch and a disk, of a spring-pin for actuating the latch, said latch being mounted and movable so as to carry the hinge-pin of the latch from one side to the other of the spring-pin, substantially as and for the purposes set forth.

5. The combination with the hinged latch for engaging the disk, of a spring-pin for actuating the latch, and a projection on the disk for shifting the latch with respect to the spring-pin, substantially as set forth.

6. The combination with the hinged latch for engaging the disk, a spring-pin for actuating the latch, a projection on the disk for shifting the latch, and a slotted plate applied on the disk to cause the latter to turn as the rope is pulled out, substantially as set forth.

In testimony whereof I have signed my name to this specification in the presence of two subscribing witnesses.

CHARLES F. WILSON.

Witnesses:
 C. SEDGWICK,
 WORTH OSGOOD.